United States Patent
Greene et al.

(10) Patent No.: US 9,780,976 B2
(45) Date of Patent: Oct. 3, 2017

(54) PASSIVE EQUALIZERS FOR DIRECTIONAL COUPLERS

(71) Applicant: Infineon Technologies AG, Neubiberg (DE)

(72) Inventors: Jake Greene, Cambridgeshire (GB); Valentyn Solomko, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/985,767

(22) Filed: Dec. 31, 2015

(65) Prior Publication Data

US 2017/0195146 A1    Jul. 6, 2017

(51) Int. Cl.
| | |
|---|---|
| *H04L 25/03* | (2006.01) |
| *H04L 7/027* | (2006.01) |
| *H04L 25/02* | (2006.01) |
| *H04B 3/14* | (2006.01) |
| *H01P 5/18* | (2006.01) |

(52) U.S. Cl.
CPC .... *H04L 25/03878* (2013.01); *H04L 25/0272* (2013.01); *H04L 25/03031* (2013.01); *H01P 5/185* (2013.01); *H04B 3/145* (2013.01)

(58) Field of Classification Search
CPC .................. H01P 5/185; H04B 3/145
See application file for complete search history.

(56) References Cited

U.S. PATENT DOCUMENTS

| | | | | |
|---|---|---|---|---|
| RE28,426 E | * | 5/1975 | Dolby | H03G 9/025 |
| | | | | 330/96 |
| 4,013,981 A | * | 3/1977 | Shintani | H04B 3/145 |
| | | | | 333/116 |
| 4,999,593 A | | 3/1991 | Anderson | |
| 7,218,186 B2 | | 5/2007 | Chen | |
| 7,821,352 B1 | * | 10/2010 | Sanvoravong | H01P 5/185 |
| | | | | 333/116 |
| 9,432,230 B1 | * | 8/2016 | Chang | H04L 27/01 |
| 2002/0070814 A1 | * | 6/2002 | Dixon | H03H 7/03 |
| | | | | 331/117 R |
| 2009/0295473 A1 | * | 12/2009 | Dupuy | H03F 1/0222 |
| | | | | 330/124 R |

* cited by examiner

*Primary Examiner* — Ross Varndell
(74) *Attorney, Agent, or Firm* — Slater Matsil, LLP (57) ABSTRACT

In accordance with an embodiment, a device includes a directional coupler having an input port, a transmitted port, a coupled port and an isolated port. The device also includes a first passive equalizer having a first terminal coupled to a first one of a coupled port and an isolated port of the directional coupler. The first passive equalizer includes a resonator having a first inductor and a first capacitor, the resonator coupled between the first terminal and a second terminal of the first passive equalizer. The first passive equalizer also includes a first resistor and a second resistor serially connected between the first and the second terminals of the first passive equalizer, the first resistor connected to the second resistor at a first node. The first equalizer further includes a shunt network coupled between a reference terminal and the first node.

27 Claims, 10 Drawing Sheets

1010 → provide an input RF signal to one of an input port and an output port of the directional coupler 1020 → equalize an output signal at one of a coupled port and an isolated port of the directional coupler using a passive equalizer, the passive equalizer comprising:
  a first terminal coupled to the one of the coupled port and the isolated port of the directional coupler;
  a resonator coupled between the first terminal and a second terminal of the passive equalizer;
  a first and a second resistors serially connected between the first and the second terminals of the passive equalizer; and
  a second capacitor coupled between a reference terminal and a node, the node being connected to the first and the second resistors

Fig. 10

PASSIVE EQUALIZERS FOR DIRECTIONAL COUPLERS

TECHNICAL FIELD

The present disclosure relates generally to an electronic device, and more particularly to a system and method for passive equalizers for directional couplers.

BACKGROUND

Directional couplers, which are electronic devices that can detect power being transmitted in a particular direction, are used in a wide variety of radio frequency (RF) circuits, for example, a directional coupler may be used in a radar system to detect a reflected wave by separating the incident wave from the reflected wave, or may be used in a circuit that measures the impedance mismatch of transmission lines. Functionally, a directional coupler has a forward transmission path and a coupled transmission path. The forward transmission path generally has a low loss, while the coupled transmission path couples a fraction of the transmission power that is propagated in a particular direction. There are many different types of coupler architectures, which may be implemented using different topologies and materials depending on the frequency of operation and the operational environment.

One common application for a directional coupler is the detection of the reflected and transmitted power in a portable radio frequency (RF) device such as a cellular telephone or a portable computing device. The measurement of the transmitted power may be used in a control loop to adjust the output of a power amplifier, while the measurement of the reflected power in conjunction with the measurement of the transmitted power may be used to adjust adjustable antenna matching networks. One parameter that limits the accuracy of such transmitted power measurements is the coupling factor of the directional coupler. Research and development has been carried out to improve the performance of directional couplers.

SUMMARY

In accordance with an embodiment, a device includes a directional coupler having an input port, a transmitted port, a coupled port and an isolated port. The device also includes a first passive equalizer having a first terminal coupled to a first one of a coupled port and an isolated port of the directional coupler. The first passive equalizer includes a resonator having a first inductor and a first capacitor, the resonator coupled between the first terminal and a second terminal of the first passive equalizer. The first passive equalizer also includes a first resistor and a second resistor serially connected between the first and the second terminals of the first passive equalizer, the first resistor connected to the second resistor at a first node. The first equalizer further includes a shunt network coupled between a reference terminal and the first node.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale. To more clearly illustrate certain embodiments, a letter indicating variations of the same structure, material, or process step may follow a figure number.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

Figure 1:
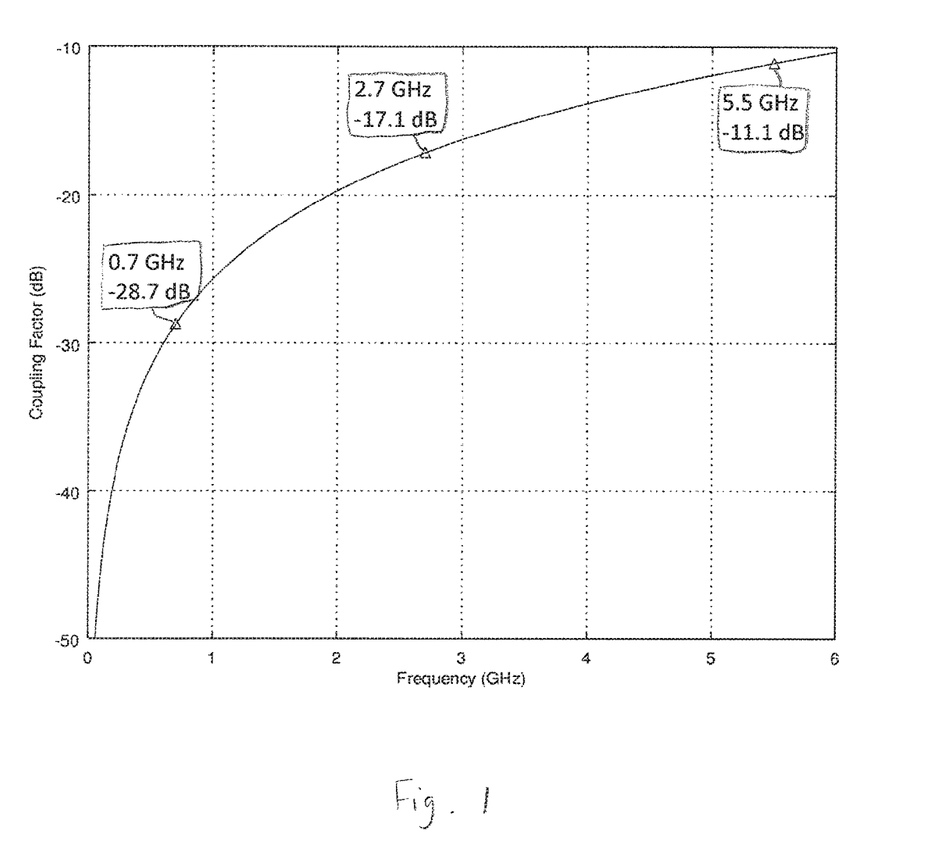
FIG. 1 illustrates the coupling factor of a directional coupler, in some embodiments.

The present invention will be described with respect to various embodiments in a specific context, a system and method for a directional coupler system with at least one passive equalizer. In some cases, it is desirable for a directional coupler to have a flat coupling factor over a wide frequency band of interest; however, directional couplers typically do not always provide a flat coupling factor over a wide bandwidth. An example of this can be observed in "electrically-short" directional couplers, where the coupler structure is much smaller than 90 degrees electrical length while the coupling factor across a broad bandwidth may exhibit a first order high-pass characteristic of about 20 dB/decade. An example is illustrated in FIG. 1, which shows the coupling factor of a typical directional coupler over a wide bandwidth of about 6 GHz. As shown in FIG. 1, the coupling factor exhibits a high-pass characteristic (e.g., coupling factor increases with frequency). At 700 MHz and 2.7 GHz, which correspond to the lower and upper end of the frequency band used for the 4G Long-Term Evolution (LTE) standard, the coupling factors are about −28.7 dB and about −17.1 dB, respectively. A large variation of the coupling factor (e.g., about 11.6 dB) over the LTE band is observed, which, if left uncompensated for, might adversely affect overall system performance.

In order to achieve good system performance, equalizers, also referred to as filter networks or filters, could be used to equalize the coupled response and to reduce the variation in coupling factor over a desired frequency band. Embodiments of the present invention use passive equalizers (e.g., equalizers formed by passive components) for equalizing directional couplers. Some embodiment passive equalizers include a filter network with negative in-band roll-off. As a result of placing a filter network with a low-pass roll-off characteristic after a directional coupler with a high-pass characteristic, the combined response after the filter network (e.g., at terminal 112 of passive equalizer 108 in FIG. 2A) is flatter across the desired frequency range. In addition, the filter network provides a constant input and output impedance that is matched to the characteristic impedance of the system (e.g., matched to a coupled transmission line) inside the operating frequency range so that the directivity of the directional coupler is not compromised by the filter network. More details regarding directional coupler systems comprising directional coupler and passive equalizer(s) are discussed hereafter.

Figure 2A:
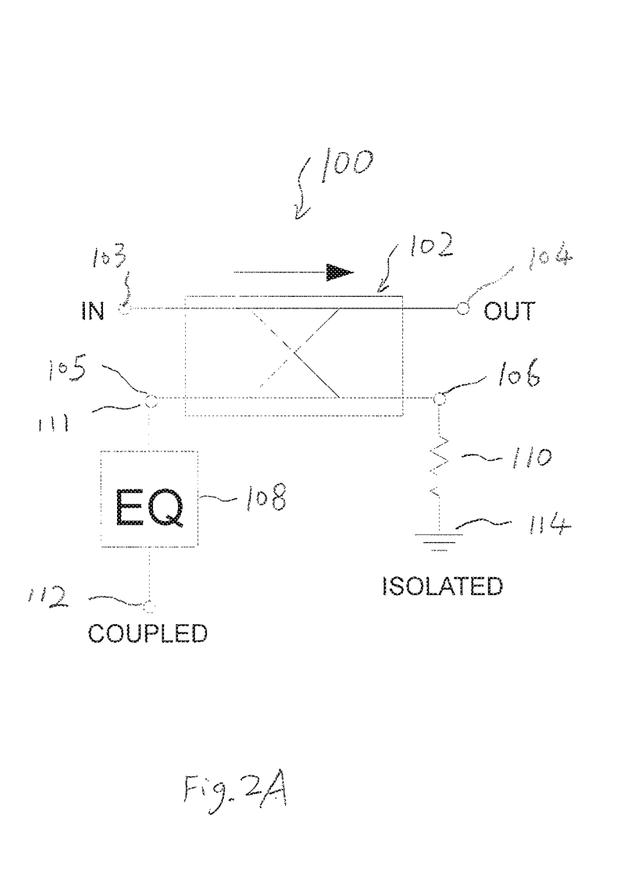
FIGS. 2A-2C illustrate various embodiments of a directional coupler system comprising a directional coupler and at least one passive equalizer, in accordance with some embodiments.

FIG. 2A illustrates a directional coupler system 100 with a passive equalizer 108 according to an embodiment of the present invention. As shown in FIG. 2A, directional coupler system 100 includes directional coupler 102, passive equalizer 108 and termination load 110. Directional coupler 102 has an input port 103, a transmitted port 104, a coupled port 105 and an isolated port 106, in some embodiments. Passive equalizer 108 has two terminals, a first terminal 111 is coupled to the coupled port 105 of directional coupler 102, a second terminal 112 of passive equalizer 108 may function as an equalized coupled port of the directional coupler system 100 and be coupled to a subsequent circuit of the system (not shown), in accordance with some embodiments. As an example, passive equalizer 108 and termination load 110 could be integrated with directional coupler 102 into one integrated circuit (IC), and terminal 112 could serve as the equalized coupled port of the IC. Details regarding the passive equalizer 108 are discussed hereinafter with reference to FIGS. 3, 4A-4C and 5. In accordance with some embodiments, isolated port 106 of directional coupler 102 is terminated by a terminate load 110. One skilled in the art will appreciate that terminate load 110 may be matched to a characteristic impedance of the system (e.g., 50Ω or 75Ω), and may be coupled between the isolated port 106 and a reference terminal 114. In some embodiments, the reference terminal 114 is a ground terminal.

One skilled in the art will appreciate that, in some embodiments, a directional coupler 102 may be a symmetric device. This means that the roles of the input port 103 and the transmitted port 104 may be switched along with roles of isolated port 106 and coupled port 105. For example, when coupled port 105 is terminated and a signal incident to transmitted port 104 is introduced, the introduced signal is transmitted to input port 103 and is coupled to the isolated port 106. It should be understood that symmetric directional couplers may be used in the various embodiments described herein.

Figure 2B:
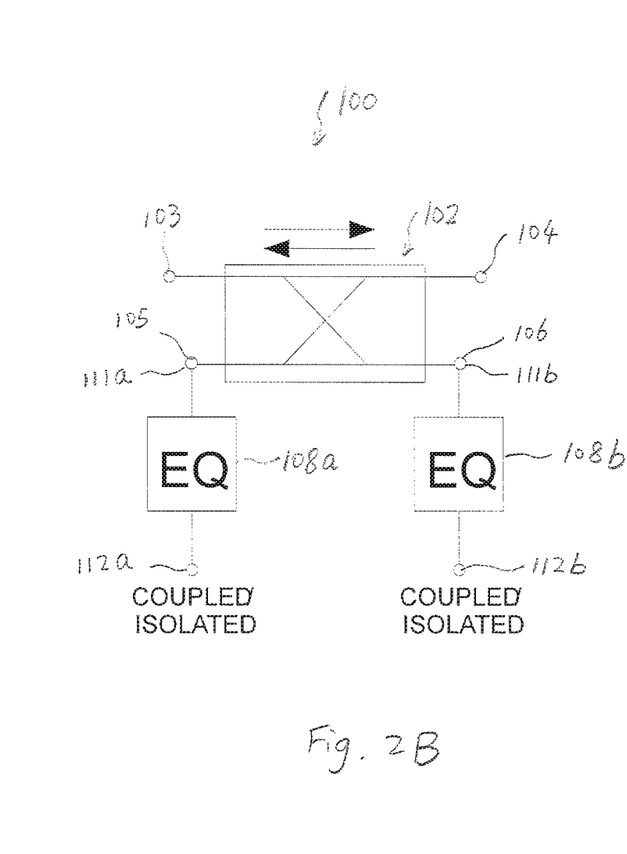

FIG. 2B illustrates a bi-directional coupler system 100 with two passive equalizers 108a/108b according to an embodiment of the present invention. In FIG. 2B, coupler 102 is a bi-directional coupler, a first terminal 111a of a first passive equalizer 108a is coupled to a first one of the coupled/isolated ports 105/106, and a first terminal 111b of a second passive equalizer 108b is coupled to a second one of the coupled/isolated ports 105/106. In accordance with some embodiments, the first passive equalizer 108a and the second passive equalizer 108b have the same structure. The second terminal 112a of the first passive equalizer 108a and the second terminal 112b of the second passive equalizer 108b may each function as an equalized coupled/isolated port of the directional coupler system 100, in some embodiments.

Figure 2C:
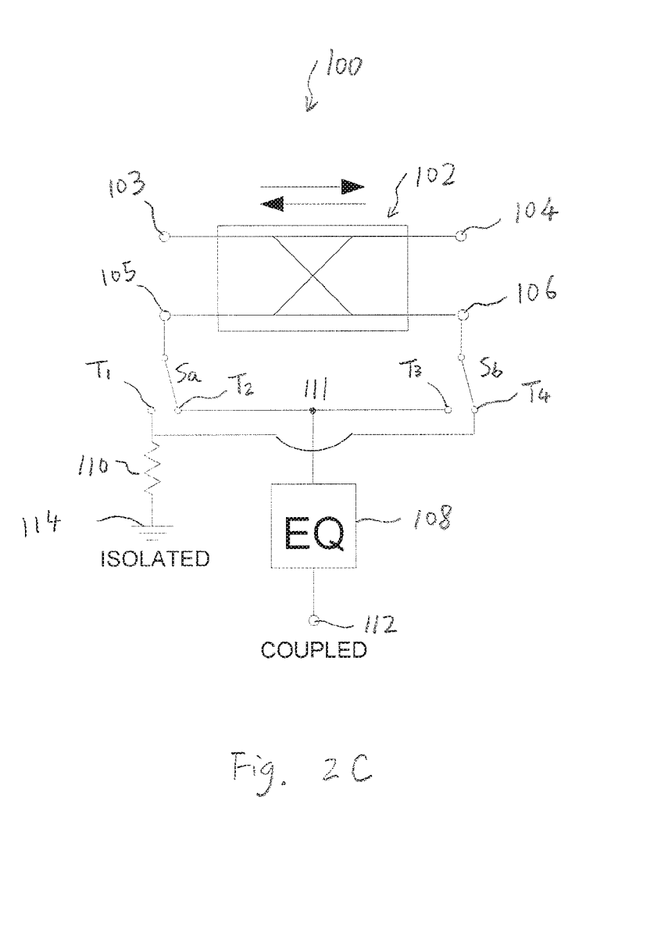

FIG. 2C illustrates a bi-directional coupler system 100 with a passive equalizer 108 and selectable coupled port, in accordance with some embodiments. As shown in FIG. 2C, the embodiment directional coupler system 100 includes bi-directional coupler 102, passive equalizer 108, termination load 110, and two switches $S_a$ and $S_b$. In accordance with some embodiments, switch $S_a$ has two selectable positions $T_1$ and $T_2$, and switch $S_b$ has two selectable positions $T_3$ and $T_4$. Switches $S_a$ and $S_b$ are synchronized such that at their respective first positions, switch $S_a$ is at position $T_2$ and switch $S_b$ is at position $T_4$; and at the respective second positions of switches $S_a$ and $S_b$, switch $S_a$ is at position $T_1$ and switch $S_b$ is at position $T_3$. Though FIG. 2C shows two switches $S_a$ and $S_b$, other numbers and/or types of switches are possible and are within the scope of the current disclosure, for example, switches $S_a$ and $S_b$ may be replaced by a double-pole double-throw switch that connects to coupled/isolated ports 105/106 and performs the same or similar function as switches $S_a$ and $S_b$.

As shown in FIG. 2C, when switches $S_a$ and $S_b$ are at their respective first positions (e.g., $T_2$ and $T_4$), coupled/isolated port 105 of bi-directional coupler 102 is coupled to the first terminal 111 of passive equalizer 108, and coupled/isolated port 106 of bi-directional coupler 102 is terminated by termination load 110; when switches $S_a$ and $S_b$ are at their respective second positions (e.g., $T_1$ and $T_3$), coupled/isolated port 105 of bi-directional coupler 102 is terminated by termination load 110, and coupled/isolated port 106 of bi-directional coupler 102 is coupled to the first terminal 111 of passive equalizer 108. The second terminal 112 of the passive equalizer 108 may function as the equalized coupled port of the directional coupler system 100, in accordance with some embodiments.

In FIG. 2C, the bi-directional coupler system 100 is implemented by attaching switches (e.g., switches $S_a$ and $S_b$) between the coupled/isolated ports 105/106 and the passive equalizer 108 and termination load 110. The switches select the direction for sensing, for example, forward sensing or reverse sensing. As a result of the flexible architecture shown in FIG. 2C, only one passive equalizer 108 and one termination load 110 are used in the bi-directional coupler system 100 (e.g., compare with FIG. 2B where two equalizers are used), which lowers the component cost of the system. Furthermore, a well-controlled termination load impedance at the isolated port allows for high directivity over wide frequency range. The passive equalizer 108, switches $S_a$ and $S_b$, and termination load 110 may be monolithically integrated with the bi-directional coupler 102 on a semiconductor substrate as an integrated circuit (IC), in which case, the design shown in FIG. 2C, using one passive equalizer and one termination load, could also result in significant saving of silicon area. The passive equalizer 108 has inductor(s) (see inductor L in FIG. 3, and inductors $L_1$ and $L_2$ in FIG. 5), and as a large silicon area is usually required to implement on-chip inductors, reduction in the number of passive equalizers could significantly reduce required die area.

The design shown in FIG. 2C has another advantage that directivity of couplers only depends on the accuracy of the termination load 110 and does not depend on the accuracies of the components of the passive equalizer 108. As a result, high directivity of the coupler system 100 can be achieved in volume production.

Figure 3:
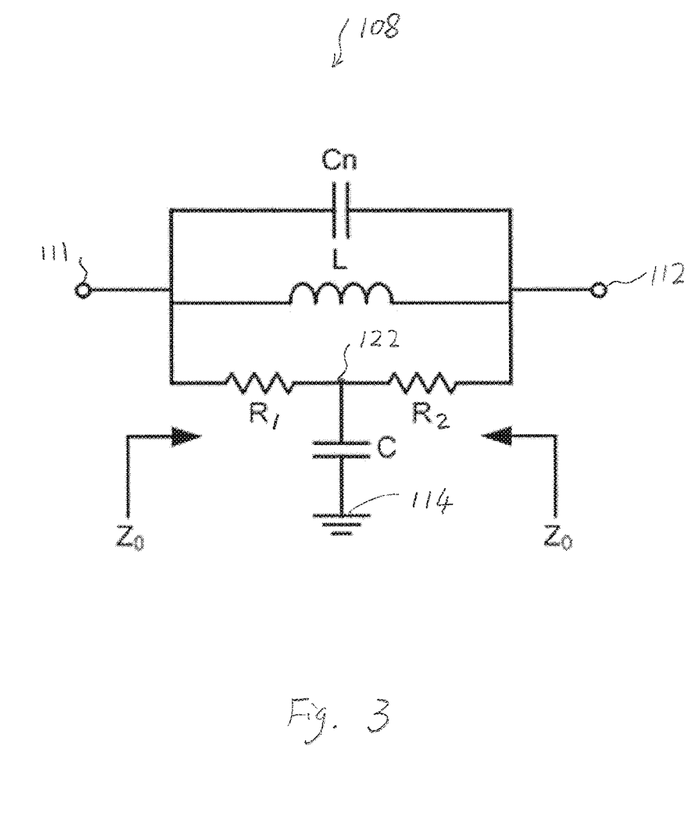
FIG. 3 illustrates an embodiment passive equalizer.

The structure of the passive equalizer 108 is now discussed in detail with reference to FIGS. 3, 4A-4C and 5. Referring to FIG. 3, a structure for a passive equalizer 108 is shown which has a low-pass topology and may be referred to as the low-pass design hereafter. As illustrated in FIG. 3, passive equalizer 108 includes a resonant circuit coupled between the first terminal 111 and the second terminal 112 of passive equalizer 108 that includes a first capacitor $C_n$ coupled in parallel with an inductor L. Due to the parallel coupling between the first capacitor $C_n$ and inductor L, the resonator circuit shown in FIG. 3 may also be referred to as a parallel resonant circuit hereafter. One skilled in the art will appreciate that a resonant circuit may also be referred to as a resonator, an LC circuit, or a tank circuit. It should be further appreciated that resonant circuits may be built using any suitable electrical components, such as ceramic capacitors, surface-acoustic-wave (SAW) filters, and transmission lines.

A first resistor $R_1$ and a second resistor $R_2$ are serially coupled between the first terminal 111 and the second terminal 112 of the passive equalizer 108, in some embodiments. As shown in FIG. 3, the first resistor $R_1$ is connected to the second resistor $R_2$ at a first node 122. The passive equalizer may further include a second capacitor C coupled between a reference terminal 114 and the first node 122, in some embodiments. The second capacitor C may also be referred to as shunt capacitor C, or a shunt network herein. The reference terminal 114 is a ground terminal, in accordance with some embodiments.

As discussed above, passive equalizer 108 is a non-reflective equalizer providing spectral flattening for the coupled signals, while exhibiting little or no mismatch in the path to which it is attached. In addition, for the low-pass designs shown in FIG. 3, the parallel resonant circuit creates a frequency-selective notch (see the frequency-selective notch centered about 5.5 GHz in FIG. 6) in the frequency response of the equalized output of the passive equalizer 108, which frequency-selective notch can be introduced outside or within the band of interest to suppress unwanted frequencies or to further shape the frequency response of the equalized output, respectively. The frequency-selective notch provided by the resonator circuit is another advantage of the present disclosure over existing designs.

Figure 4A:
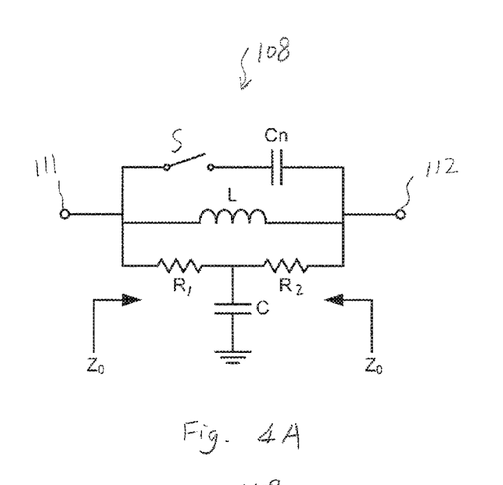
FIGS. 4A-4C illustrate various examples of passive equalizers with tunable locations of frequency notch, in some embodiments.
Figure 4B:
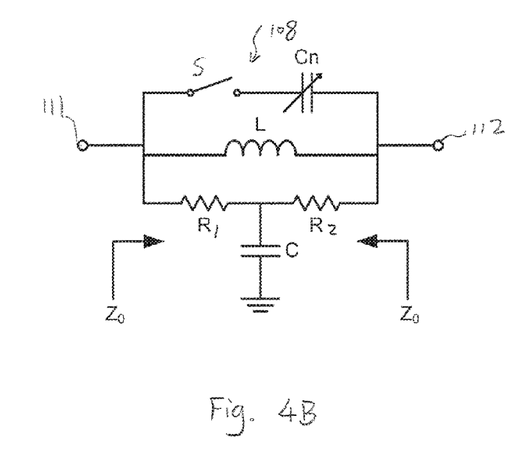
Figure 4C:
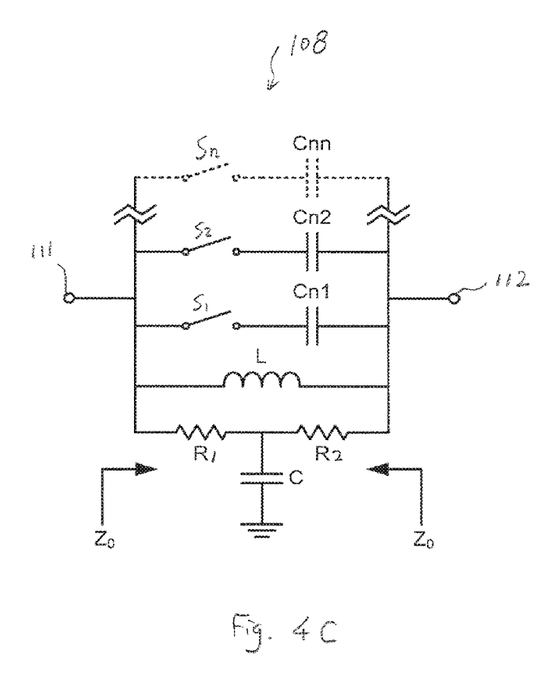

FIGS. 4A-4C illustrate several embodiment passive equalizers 108 with tunable locations for the frequency-selective notch. In FIG. 4A, the embodiment passive equalizer 108 is similar to the low-pass design in FIG. 3, but has an additional switch S coupled between the first capacitor $C_n$ and one of first and the second terminals 111/112 of passive equalizer 108, e.g., between first capacitor $C_n$ and the first terminal 111. In accordance with some embodiments, when switch S is closed, the first capacitor $C_n$ forms a parallel resonant circuit with inductor L and provides a frequency-selective notch; when switch S is open, the first capacitor $C_n$ is bypassed in the passive equalizer 108 and no resonant circuit is formed.

FIG. 4B illustrates a passive equalizer 108 similar to the passive equalizer shown in FIG. 4A, but with an adjustable first capacitor $C_n$. The design in FIG. 4B offers the same option to bypass the resonant circuit as the design shown in FIG. 4A. In addition, the design in FIG. 4B offers the added flexibility of varying capacitance $C_n$ to control the location of the frequency-selective notch to suppressed frequencies at different locations, or to provide more flexibility in shaping the frequency response of the equalized output.

FIG. 4C illustrates a passive equalizer 108, which uses a programmable capacitor array. In some embodiments, the capacitor array includes a plurality of capacitors $C_{n1}$, $C_{n2}$, ... $C_{nn}$ coupled in parallel to the first inductor L, with a plurality of switches $S_1$, $S_2$, ... $S_n$ coupled between a respective one of the plurality of capacitors $C_{n1}, C_{n2}, \ldots C_{nn}$ and one of the first and the second terminals 111/112 of the passive equalizer 108. By closing or opening the plurality of switches $S_1, S_2, \ldots S_n$, the total capacitance of the resonator circuit (e.g., sum of the capacitance of capacitors in $C_{n1}$, $C_{n2}, \ldots C_{nn}$ with a respective closed switch) can be varied, which provides similar functionality as the adjustable capacitor $C_n$ in FIG. 4B.

For the low-pass designs shown in FIGS. 3 and 4A-4C, equations (1)-(3) describe the relationship between the components in the passive filter 108 (e.g., inductance L of the first inductor, capacitance $C_n$ of the first capacitor, and capacitance C of the shunt capacitor) and the characteristic impedance $Z_0$ of the passive filter 108. In equations (1)-(3), $Z_1$ is the impedance of the LC circuit comprising L and $C_n$, $Z_2$ is the impedance of the shunt capacitor C, R is the input/output impedance of the passive filter 108, and ω is the angular frequency at the lower edge of the usable frequency band. When the value of $C_n$ is much smaller than C, equation (3) can be simplified into equation (4).

$$Z_1 = \frac{(j\omega L)\left(\frac{1}{j\omega C_n}\right)}{j\omega L + \frac{1}{j\omega C_n}} = -j\left(\frac{\omega L}{\omega^2 L C_n - 1}\right) \quad (1)$$

$$Z_2 = \frac{1}{j\omega C} \quad (2)$$

$$R = Z_0 = \sqrt{Z_1 Z_2} = \sqrt{\left(\frac{-j\omega L}{\omega^2 L C_n - 1}\right)\left(\frac{1}{j\omega C}\right)} = \sqrt{\frac{L}{C(1 - \omega^2 L C_n)}} \quad (3)$$

$$R = Z_0 = \sqrt{\frac{L}{C}} \quad (4)$$

For a matched circuit, both resistors $R_1$ and $R_2$ have matching resistor values R, which are both substantially equal to $Z_0$ in value, in some embodiments. In accordance with some embodiments, the operating frequency range of the coupler is below the resonant frequency of the parallel resonant tank, e.g., $\omega < 1/\sqrt{LC_n}$. When ω is much smaller than $1/\sqrt{LC_n}$ (e.g., $<<1/\sqrt{LC_n}$), equation (3) can be approximated by equation (4). Since equation (4) is independent of ω, a substantially constant matching impedance could be provided by the equalizer 108 in the desired operating frequency range of the coupler. In accordance with some embodiments, the inductance L of the first inductor has a value between about 1 nH to about 10 nH, the resistance R has a value between about 30Ω and about 100Ω, the capacitance $C_n$ has a value between about 0.5 pF to about 10 pF, and capacitance C has a value between about 0.5 pF to about 10 pF. Alternatively, other values outside of the above ranges may be used.

For the low-pass design, the parameters for the reactive components, e.g., inductance L and capacitance C, are selected to control the cut-off frequency and roll-off characteristics of the passive equalizer 108, which in turn, controls the flatness of the coupled output of the directional coupler system 100 across the frequency band of interest, in some embodiments. In addition, the capacitor $C_n$ forms a parallel resonator with inductor L, and its capacitance $C_n$ can be varied to provide a tunable, frequency-selective notch to suppress unwanted frequencies at pre-determined locations, as discussed above with reference to FIGS. 3 and 4A-4C.

Figure 5:
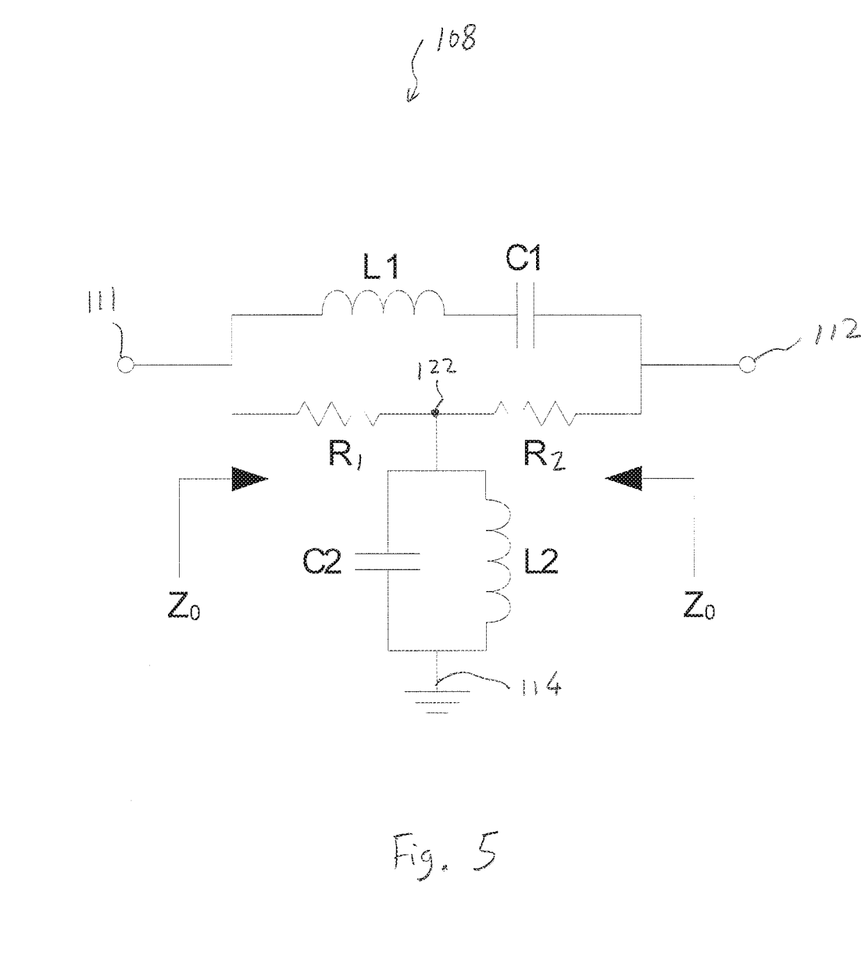
FIG. 5 illustrates another embodiment passive equalizer.

FIG. 5 illustrates a passive equalizer 108 having a band-pass topology and may be referred to as the band-pass design hereafter. In some embodiments, the band-pass design of FIG. 5 may achieve a flatter frequency response for the coupled output of the directional coupler system 100 than that of the low-pass designs shown in FIGS. 3 and 4A-4C. The band-pass design shown in FIG. 5, however, does not provide additional frequency suppression for out-of-band signals, in some embodiments.

As shown in FIG. 5, the passive equalizer 108 includes a resonant circuit that has a first inductor $L_1$ serially coupled with a first capacitor $C_1$, with the resonant circuit being coupled between the first terminal 111 and the second terminal 112 of the passive equalizer 108. Due to the serial coupling of the first inductor $L_1$ and the first capacitor $C_1$, the resonant circuit shown in FIG. 5 may be referred to as a series resonator circuit hereafter. A first resistor $R_1$ and a second resistor $R_2$ are coupled serially between the first terminal 111 and the second terminal 112 of the passive equalizer 108, in some embodiments. As shown in FIG. 5, the first resistor $R_1$ is coupled to the second resistor $R_2$ at a first node 122. The passive equalizer 108 may further include a second capacitor $C_2$ and a second inductor $L_2$ coupled in parallel between a reference terminal 114 and the first node 122, in some embodiments. The second capacitor $C_2$ and the second inductor $L_2$ form a shunt network in the form of a parallel resonant circuit, which may also be referred to as a shunt resonator. In accordance with some embodiments, the reference terminal 114 is a ground terminal.

The band-pass design shown in FIG. 5 exhibits a steeper roll-off than that of the low-pass design when both the series resonator and the shunt resonator are tuned to a resonant frequency at the lower end of the band of interest, in accordance with some embodiments. In other embodiments, the series resonator and the shunt resonator may be tuned to a first resonant frequency and a second resonant frequency at the lower end of the band of interest, respectively, where the first and the second resonant frequencies are close to each other. For example, for a directional coupler used for LTE (e.g., from 700 MHz to 2.7 GHz), the series resonator and the shunt resonator may both be tuned to a lower end of the band at, e.g., around 700 MHz. By tuning both the series and shunt resonators, the band-pass design of FIG. 5 provides the ability to optimize the in-band flatness and provides superior gain flatness for the coupled signals. The band-pass design, however, does not offer the additional frequency selectivity (e.g., rejection of out-of-band frequencies at around 5.5 GHz in the WLAN band for the working frequency range of 700 MHz to 2.7 GHz) as dictated by the parallel resonator comprising L and $C_n$ in the low-pass designs illustrated in FIGS. 3 and 4A-4C. In accordance with some embodiments, the Q-factors of the reactive components of the resonators (e.g., capacitor $C_1/C_2$ and inductor $L_1/L_2$ of the series and shunt resonators) are 10 or higher. High Q-factors (e.g., 10 or above) reduce the effect of the bandwidths of the resonators (e.g., the series and shunt resonators) on the total response of the passive equalizer 108, in some embodiments. Due to the high-Q factors, the bandwidths of the resonator circuits may not significantly affect the response of passive equalizer 108.

As with the low-pass design, the two resistors $R_1$ and $R_2$ in the band-pass design of FIG. 5 should be matched to the characteristic impedance $Z_0$ in equation (7) for optimal coupler performance. Impedances $Z_S$ and $Z_P$ of the series resonator and the shunt resonator in passive equalizer 108 of FIG. 5, are given in equations (5) and (6), respectively. Equation (7) gives the input and output impedance R of the equalizer 108.

$$Z_s = j\omega L_1 + \frac{1}{j\omega C_1} = j\left(\frac{\omega^2 L_1 C_1 - 1}{\omega C_1}\right) \quad (5)$$

$$Z_p = \frac{(j\omega L_2)\left(\frac{1}{j\omega C_2}\right)}{j\omega L_2 + \frac{1}{j\omega C_2}} = -j\left(\frac{\omega L_2}{\omega^2 L_2 C_2 - 1}\right) \quad (6)$$

$$R = Z_0 = \sqrt{Z_s Z_p} = \sqrt{\left(\frac{\omega^2 L_1 C_1 - 1}{-j\omega C_1}\right)\left(\frac{-j\omega L_2}{\omega^2 L_2 C_2 - 1}\right)} = \sqrt{\frac{L_2(\omega^2 L_1 C_1 - 1)}{C_1(\omega^2 L_2 C_2 - 1)}} \quad (7)$$

Referring to FIG. 5, the parameters for the reactive components of the passive equalizer 108, such as inductance $L_1$ and capacitance $C_1$ of the series resonator, inductance $L_2$ and capacitance $C_2$ of the shunt resonator, are selected according to equation (7), in some embodiments. In accordance with some embodiments, the inductance $L_1$ has a value between about 1 nH to about 20 nH, the capacitance $C_1$ has a value between about 0.5 pF to about 20 pF, the impedance R has a value between about 30Ω and about 70Ω, the capacitance $C_2$ has a value between about 0.5 pF to about 20 pF, and the inductance $L_2$ has a value between about 1 nH to about 20 nH. Alternatively, other values outside of the above ranges may be used.

For the band-pass design, when the first inductor $L_1$ and the second inductor $L_2$ are of an equal inductance L, and when the first capacitor $C_1$ and $C_2$ are of an equal capacitance C, the characteristic impedance $Z_0$ in equation (7) reduces to equation (8) below, $$R = Z_0 = \sqrt{\frac{L(\omega^2 LC - 1)}{C(\omega^2 LC - 1)}} = \sqrt{\frac{L}{C}} \quad (8)$$

which has the same expression as equation (4) for the low-pass design shown in FIGS. 3 and 4A-4C. The values of $L_1$, $L_2$, $C_1$ and $C_2$ determine the bandwidth of operation and the frequency roll-off of the band-pass design shown in FIG. 5. In some embodiments, the series resonator is tuned to a first resonant frequency $\omega_1 = 1/\sqrt{L_1 C_1}$, where $\omega_1 = 2\pi f_1$, and the parallel resonant circuit (e.g., shunt resonator) is tuned to a second resonant frequency $\omega_2 = 1/\sqrt{L_2 C_2}$, where $\omega_2 = 2\pi f_2$. In the above equations, $\omega_1$ and $\omega_2$ may be the same resonant frequency (e.g., $\omega_1 = \omega_2$) or two closely-spaced resonant frequencies (e.g., $\omega_1 \approx \omega_2$) at the lower end of the band of interest (e.g., at or near the lowest frequency of the band of interest), For both the low-pass design and the band-pass design, it is possible to tune the passive equalizer to obtain a roll-off steeper than a roll-off obtained when using equations (1)-(4) and (5)-(8). Generally, this involves compromising the quality of impedance-matching of the circuit to its respective $Z_0$, and can degrade the directivity of the coupler to which the equalizer is connected. This, however, can allow the equalizers to be used over wider bandwidths and achieve flatter coupling than that of a matched circuit.

The directional coupler systems 100 illustrated in FIGS. 2A-2C are implemented as a discrete solution, in some embodiments. For example, the passive equalizer 108 could be implemented using discrete components such as discrete inductors and discrete capacitors. The discrete passive equalizer 108, directional coupler 102, termination load 110 and one or more switches may be mounted on a suitable substrate such as a printed circuit board (PCB). In other embodiments, the passive equalizer 108 is integrated into the design of directional coupler 102 as an auxiliary circuit, and the directional coupler systems 100 shown in FIGS. 2A-2C are implemented as an integrated solution, e.g., as an integrated circuit (IC) fabricated on a monolithic semiconductor substrate such as Silicon, Gallium-Arsenide, Gallium-Nitride, Indium-Phosphide, Silicon-On-Insulator (SOI), or other suitable semiconductor substrates. The integrated solution may provide additional advantages such as reduced size, cost, and power consumption compared with the discrete solution.

Figure 6:
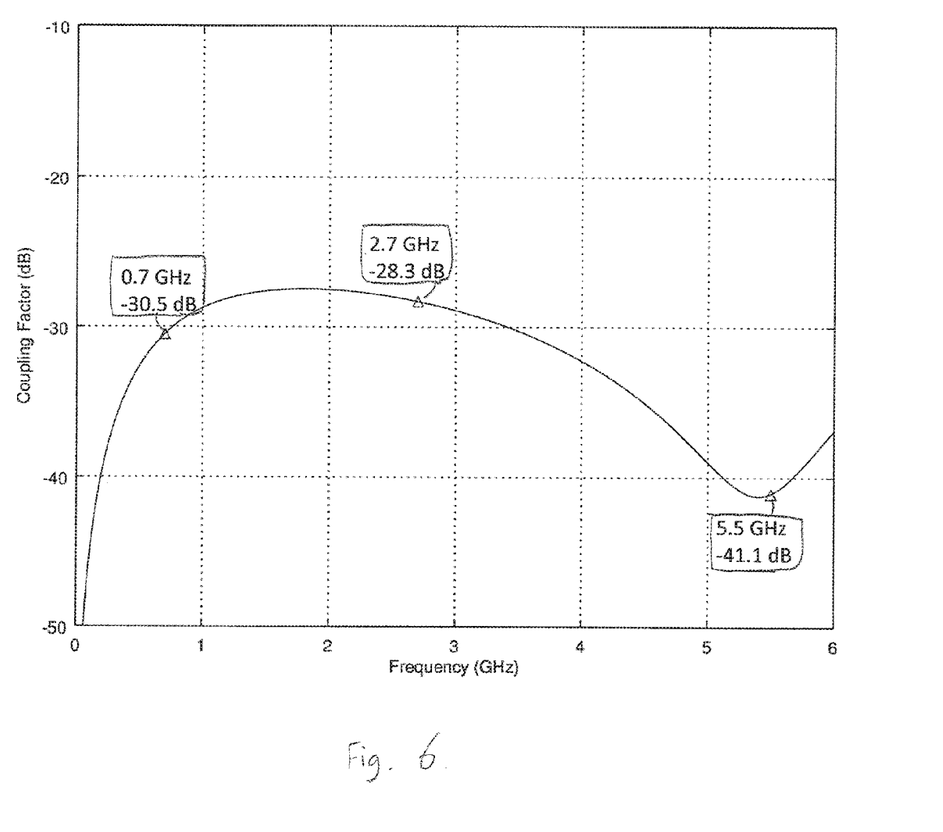
FIG. 6 illustrates the coupling factor of a directional coupler system with a low-pass passive equalizer, in some embodiments.

FIG. 6 shows simulation results for the coupling factor of a directional coupler system using the low-pass design for the passive equalizer. In particular, in FIG. 6, a passive equalizer with a low-pass design, such as those shown in FIGS. 2 and 3A-3C, is inserted into the coupled path of a directional coupler and simulated. For comparison purposes, the directional coupler used in the simulation is the same as the directional coupler used in generating the simulation results of FIG. 1.

Referring to FIG. 6, at 700 MHz and 2.7 GHz, the coupling factor is about −30.5 dB and -28.3 dB, respectively. The variation of the coupling factors between the lower and upper ends of the LTE band has been reduced to about 2.2 dB, which is much smaller than the 11.6 dB variation observed in FIG. 1 for the same directional coupler without the passive equalizer. In addition, the parallel resonant circuit comprising capacitor $C_n$ and inductor L has produced a frequency notch at around 5.5 GHz. Comparing with FIG. 1, a rejection of 30 dB is provided for out-of-band frequencies at around 5.5 GHz. Though not pictured, the capacitor $C_n$ of the parallel resonant circuit could also be tuned to change the location of the frequency notch to, for example, 2.4 GHz, to suppress WLAN 802.11bg signals while utilizing the low-frequency LTE channels between 700 MHz and 900 MHz.

Figure 7:
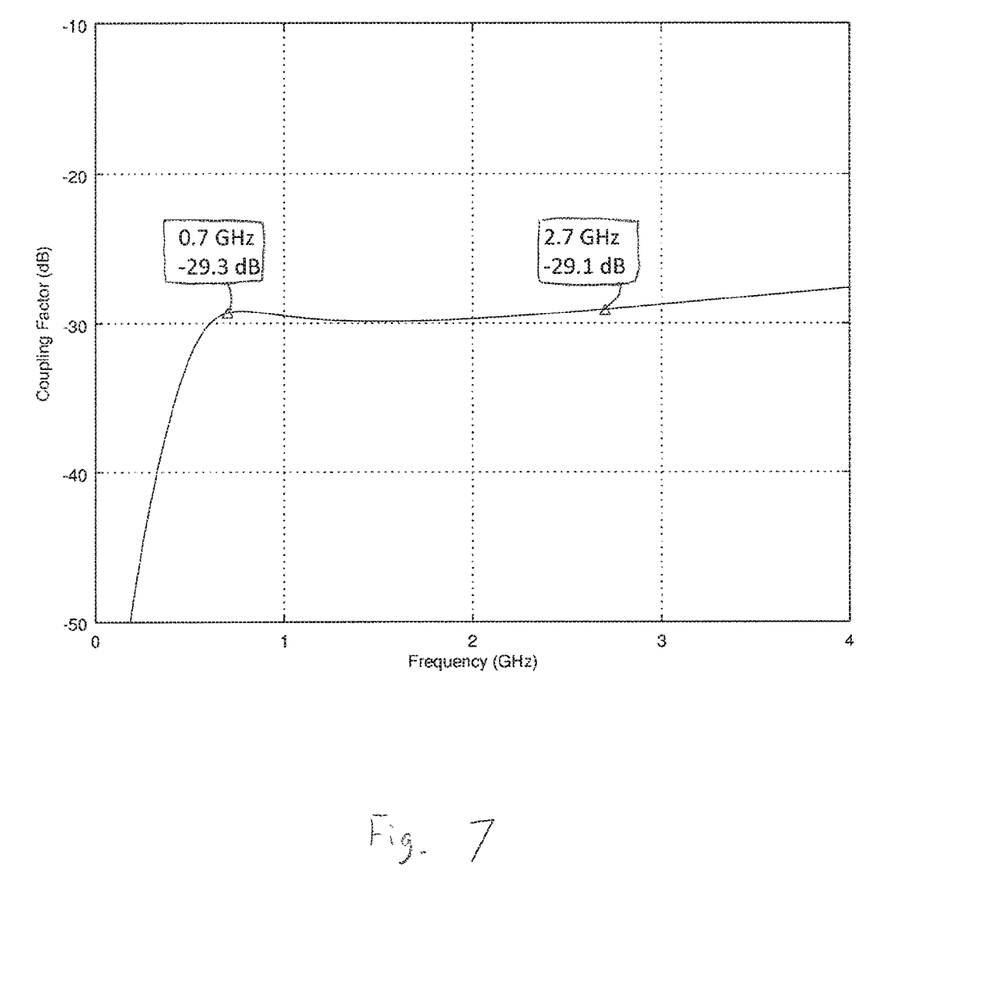
FIG. 7 illustrates the coupling factor of another directional coupler system with a band-pass passive equalizer, in some embodiments.

FIG. 7 illustrates simulation results for the coupling factor of a directional coupler system using the band-pass design for the passive equalizer. A passive equalizer with a band-pass design, as shown in FIG. 5, is inserted into the coupled path of the same directional coupler used in FIG. 1 and simulated. A substantially flat coupling factor is observed over a wide bandwidth. For example, the coupler factors at 700 MHz and 2.7 GHz are about −29.3 dB and -29.1 dB, respectively. A small variation of about 0.2 dB is observed between the upper and the lower ends of the LTE band. The superior coupling flatness (e.g., about 0.2 dB variation) of the band-pass design demonstrates another advantage of the current disclosure over existing designs.

Figure 8:
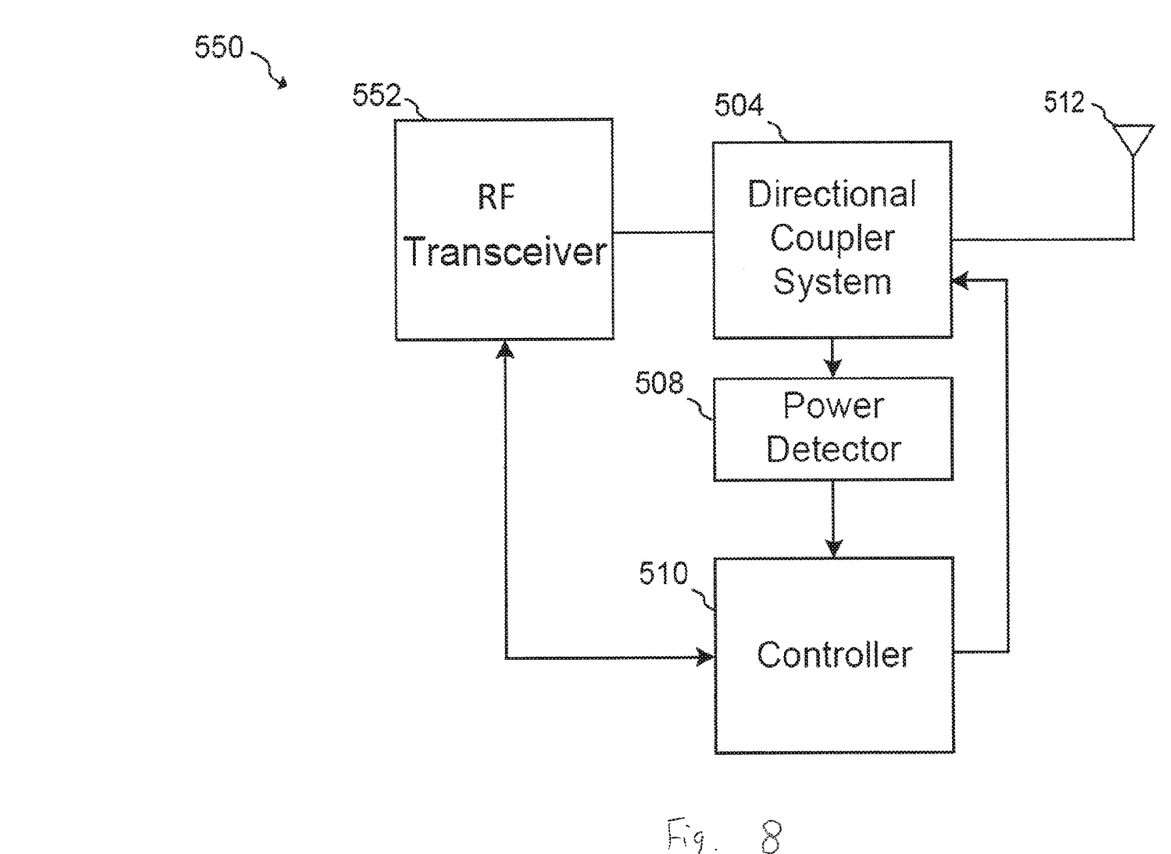
FIG. 8 illustrates a radio frequency (RF) system comprising a directional coupler system, in some embodiments.

FIG. 8 illustrates an embodiment radio frequency (RF) system 550 according to another embodiment of the present invention. System 550 includes RF transceiver 552 coupled to antenna 512 via embodiment directional coupler system 504. The output of directional coupler system 504 is coupled to the controller 510 via power detector 508. System 550 may be used, for example, to measure transmitted and reflected power in the forward and reverse direction by selecting a position of a switch within directional coupler system 504. Directional coupler system 504 may be implemented, for example, using embodiment directional couplers systems 100 disclosed herein.

Figure 9A:
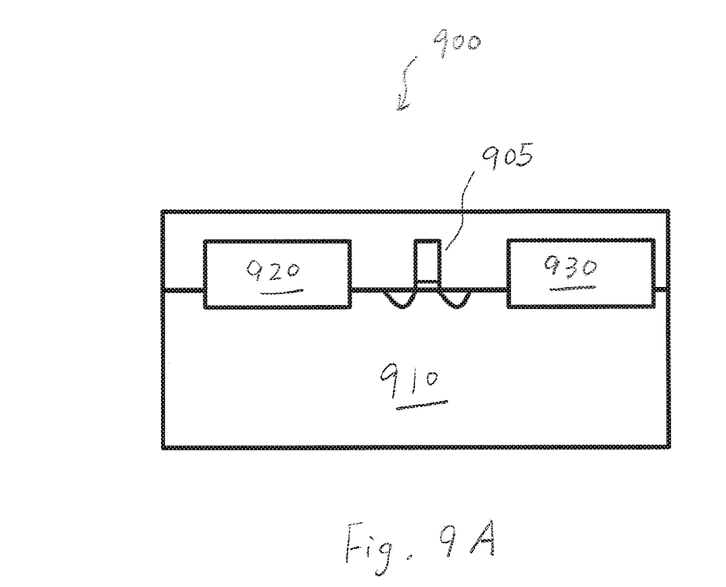
FIGS. 9A and 9B illustrate cross-sectional views of integrated circuits having a directional coupler and a passive equalizer, in some embodiments.
Figure 9B:
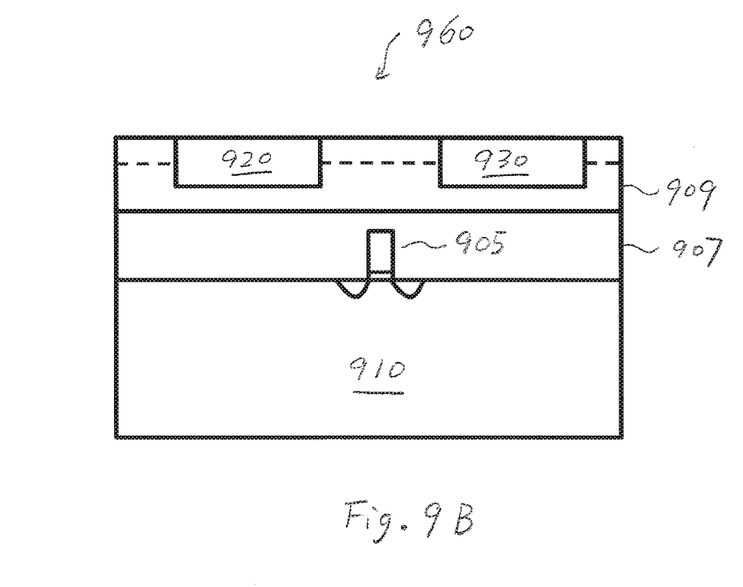

FIGS. 9A and 9B illustrate cross-sectional views of embodiment semiconductor devices (e.g., integrated circuits (ICs) 900 and 960). Semiconductor device 900 (or 960) includes a directional coupler 920 and a passive network 930 integrated on a semiconductor substrate 910, in some embodiments. Semiconductor substrate 910 may comprise crystalline Silicon, crystalline Germanium, Silicon Germanium, and/or a III-V compound semiconductor such as GaAsP, AlIAs, AlGaAs, GaInAs, GaInP, GaInAsP, and the like. Semiconductor substrate 910 may also be a bulk silicon substrate or a Silicon-On-Insulator (SOI) substrate. Shallow Trench Isolation (STI) regions (not shown) may be formed in semiconductor substrate 910 to isolate the active regions in semiconductor substrate 910.

As illustrated in FIG. 9A, semiconductor device 900 has a transistor 905 formed in/on substrate 910. A directional coupler 920 and a passive network 930 are formed in/on substrate 910, in accordance with some embodiments. Directional couplers 920 may be any suitable directional coupler, such as directional coupler 102 illustrated in FIGS. 2A-2C. Passive network 930 may include passive equalizer 108 in the present disclosure, and may further include additional passive components such as a termination load for directional coupler 920. Although not shown, conductive features (e.g., conductive lines and vias) connect directional coupler 920 and passive network 930 with other circuits in semiconductor device 900.

FIG. 9B illustrates another embodiment semiconductor device 960, with like numbers in FIG. 9B denoting like parts in FIG. 9A. As illustrated in FIG. 9B, an interlayer dielectric (ILD) layer 907 is formed on substrate 910. Structure 909, which may be an inter-metal dielectric (IMD) layer or a redistribution layer (RDL), is formed over ILD layer 907. Structure 909 may comprises one or more dielectric layers, with conductive features such as metal lines and vias (not shown) forming interconnect structures in the dielectric layers. The dielectric layers of structure 909 comprise silicon oxide, silicon nitride, silicon oxynitride, low-k dielectric material, or any other suitable dielectric material, in some embodiments. Directional coupler 920 and passive network 930 are formed in structure 909, and may extend through one or more dielectric layers of structure 909, as illustrated in FIG. 9B. Although FIG. 9B shows directional coupler 920 and passive network 930 being disposed in the same layer(s), directional coupler 920 and passive network 930 may be disposed in different layers of semiconductor device 900. Although not shown, conductive features (e.g., conductive lines and vias) connect directional coupler 920 and passive network 930 with other circuits in semiconductor device 960.

Figure 10:
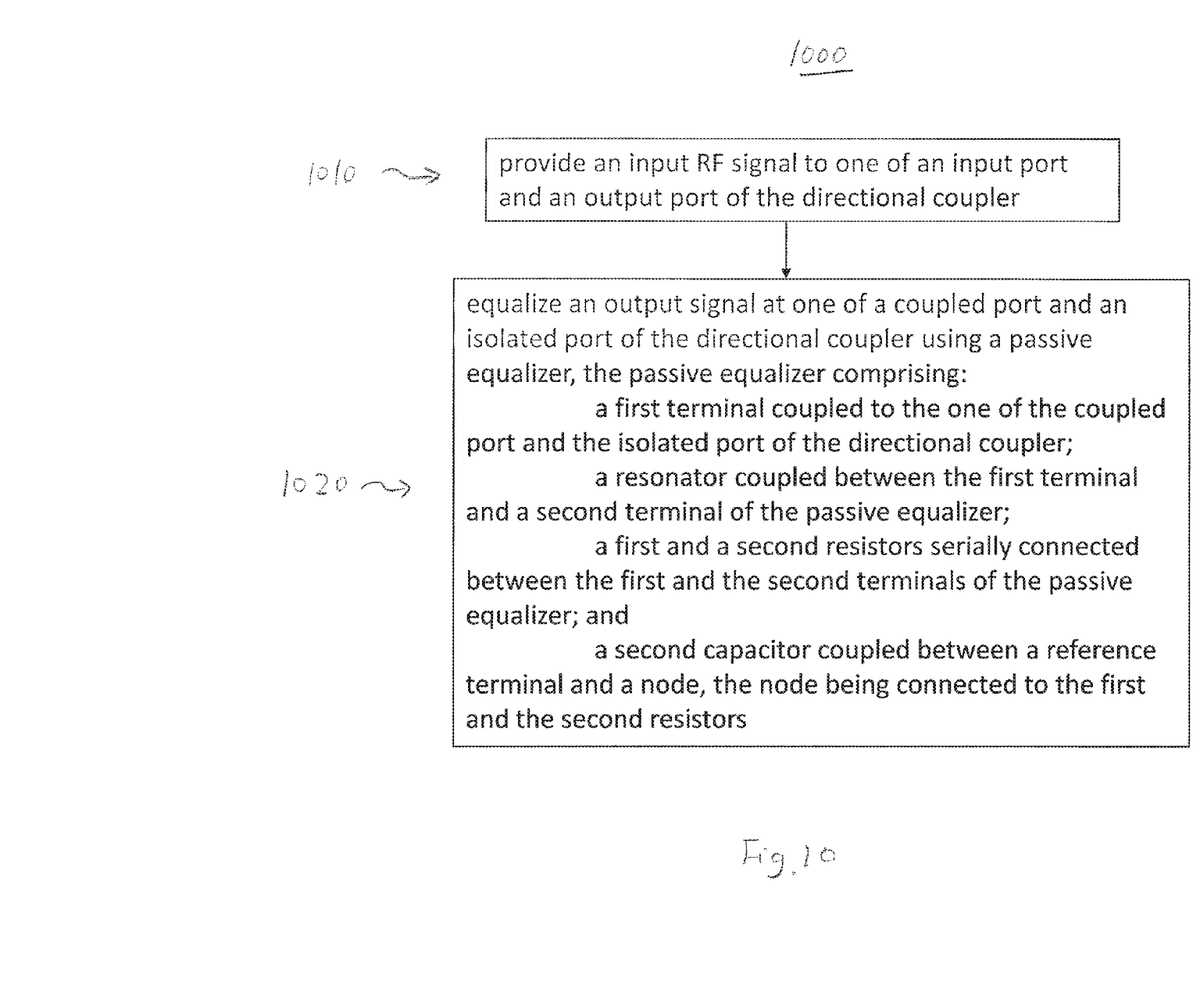
FIG. 10 illustrates a flow chart of a method of operating a directional coupler, in some embodiments.

FIG. 10 illustrates a flow chart for a method of operating a directional coupler, in accordance with some embodiments. The flowchart shown in FIG. 10 is merely an example, which should not unduly limit the scope of the claims. One of ordinary skill in the art would recognize many variations, alternatives, and modifications. Various steps, as illustrated in FIG. 10, may be added, removed, replaced, rearranged and repeated.

Referring to FIG. 10, at step 1010, an RF signal is provided to one of an input port and an output port of the directional coupler. At step 1020, an output signal at one of a coupled port and an isolated port of the directional coupler is equalized using a passive equalizer. The passive equalizer has a first terminal coupled to the one of the coupled port and the isolated port of the directional coupler, and a first resonator having a first inductor and a first capacitor, the first resonator coupled between the first terminal and a second terminal of the passive equalizer. The passive equalizer also has a first resistor and a second resistor serially connected between the first and the second terminals of the passive equalizer, and a second capacitor coupled between a reference terminal and a node, the node being connected to the first and the second resistors.

Embodiments of the present invention are summarized here. Other embodiments can also be understood form the entirety of the specification and the claims filed herein. One general aspect includes a device including a directional coupler having an input port, a transmitted port, a coupled port and an isolated port. The device also includes a first passive equalizer having a first terminal coupled to a first one of a coupled port and an isolated port of the directional coupler, the first passive equalizer including a resonator including a first inductor and a first capacitor, the resonator coupled between the first terminal and a second terminal of the first passive equalizer. The first passive equalizer also includes a first resistor and a second resistor serially connected between the first and the second terminals of the first passive equalizer, the first resistor connected to the second resistor at a first node. The first passive equalizer further includes a shunt network coupled between a reference terminal and the first node.

Implementations may include one or more of the following features. The device further may include a termination load coupled to a second one of the coupled port and the isolated port of the directional coupler. The device may further include a second passive equalizer coupled to a second one of the coupled port and the isolated port of the directional coupler. The device may further include a switch coupled between the directional coupler and the first passive equalizer, the switch having a first position and a second position. At the first position of the switch, the first terminal of the first passive equalizer is coupled to the coupled port of the directional coupler, and the isolated port of the directional coupler is terminated; and at the second position of the switch, the first terminal of the first passive equalizer is coupled to the isolated port of the directional coupler, and the coupled port of the directional coupler is terminated.

The resonator of the device may include a first inductor and a first capacitor coupled in parallel between the first and the second terminals of the first passive equalizer. The shunt network of the device may include a second capacitor coupled between the reference terminal and the first node. The capacitance of the first capacitor may be adjustable. In some embodiments, the first and the second resistors have a same resistance R, where $R=\sqrt{L/C}$, L is the inductance of the first inductor, and C is the capacitance of the second capacitor. The first passive equalizer may be configured to provide a frequency-selective notch outside a pre-determined frequency range. The resonator may include a first inductor and a first capacitor serially connected between the first and the second terminals of the first passive equalizer. The shunt network may include a second inductor and a second capacitor coupled in parallel between the reference terminal and the first node. In some embodiments, the first and the second resistors have a same resistance R, where $$R = \sqrt{\frac{L_2(\omega^2 L_1 C_1 - 1)}{C_1(\omega^2 L_2 C_2 - 1)}},$$

$C_1$ is the capacitance of the first capacitor, $L_1$ is the inductance of the first inductor, $L_2$ is the inductance of the second inductor, $C_2$ is the capacitance of the second capacitor, and $\omega$ is the angular frequency. The directional coupler and the first passive equalizer may be monolithically integrated on a semiconductor substrate.

Another general aspect includes an integrated circuit (IC) including a directional coupler disposed on a semiconductor substrate, a first switch and a second switch coupled to a coupled port and an isolated port of the directional coupler, respectively, each of the first and the second switches having a first position and a second position, and a passive equalizer having a first terminal coupled to one of the first and the second switches. The passive equalizer includes a resonator circuit coupled between the first terminal and a second terminal of the passive equalizer, a first resistor serially connected to a second resistor at a node, the first and the second resistors coupled between the first terminal and the second terminal of the passive equalizer; and a shunt network coupled between the node and a reference terminal. At respective first positions of the first and the second switches, the first terminal of the passive equalizer is coupled to the coupled port of the directional coupler, and the isolated port of the directional coupler is terminated. At respective second positions of the first and the second switches, the first terminal of the passive equalizer is coupled to the isolated port of the directional coupler, and the coupled port of the directional coupler is terminated.

In some embodiments, the resonator circuit includes a first inductor and a first capacitor coupled in parallel between the first and the second terminals of the passive equalizer. In some embodiments, the shunt network comprises a second capacitor coupled between the node and the reference terminal. A capacitance of the first capacitor of the resonator circuit may be adjustable. The passive equalizer may further include a third switch coupled between the first capacitor and one of the first and the second terminals of the passive equalizer.

In accordance with some embodiments, the IC further includes a third capacitor coupled in parallel to the first capacitor, and a fourth switch coupled between the third capacitor and one of the first and the second terminals of the passive equalizer. In various embodiments, the passive equalizer reduces variations of a coupling factor of the directional coupler over a pre-determined bandwidth, provides a substantially constant impedance over the pre-determined bandwidth, and provides a frequency selective notch outside the pre-determined bandwidth to suppress a set of pre-determined frequencies. In other embodiments, the resonator circuit includes a first inductor and a first capacitor serially connected between the first and the second terminals of the passive equalizer. In yet another embodiment, the shunt network includes a second inductor and a second capacitor coupled in parallel between the node and the reference terminal. In accordance with some embodiments, the directional coupler is disposed in one or more layer over the semiconductor substrate.

A further general aspect includes a method of operating a directional coupler including providing an input RF signal to one of an input port and an output port of the directional coupler; and equalizing an output signal at one of a coupled port and an isolated port of the directional coupler using a passive equalizer. The passive equalizer includes a first terminal coupled to the one of the coupled port and the isolated port of the directional coupler, a resonator coupled between the first terminal and a second terminal of the passive equalizer, a first and a second resistors serially connected between the first and the second terminals of the passive equalizer; and a second capacitor coupled between a reference terminal and a node, the node being connected to the first and the second resistors.

In some embodiments, the method further includes measuring a power of a coupled RF output signal at the second terminal of the passive equalizer using a power detector. In other embodiments, the resonator includes a first inductor and a first capacitor connected in parallel, and the method further includes varying a capacitance of the first capacitor to change a location of a frequency selective notch to suppress a pre-determined set of frequencies. In yet another embodiment, the resonator includes a first inductor and a first capacitor serially connected, and the passive equalizer further includes a second inductor coupled in parallel to the second capacitor to form a shunt resonator, and the method further includes tuning the first resonator and the shunt resonator to a resonant frequency at a lower end of a pre-determined bandwidth. In various embodiments, the resonator includes a first inductor and a first capacitor serially connected, and the passive equalizer further includes a second inductor coupled in parallel to the second capacitor to form a shunt resonator, and the method further includes tuning the first resonator and the shunt resonator to a first resonant frequency and a second resonant frequency at a lower end of a pre-determined bandwidth, respectively.

Advantages of some embodiment passive equalizers include the ability to simultaneously provide flat coupling over a wide bandwidth and a constant resistive match over the wide bandwidth. In addition, the low-pass design of passive equalizers further provides the ability to tune the location of a frequency-selective notch to suppress out-of-band frequencies, and the band-pass design further provides the ability to optimize the in-band flatness and provides superior coupling flatness. The passive equalizer could be integrated with the directional coupler into an IC to provide a high level of integration as well as reduction in size, cost and power consumption. The directivity of a directional coupler system using the disclosed passive equalizer depends only on the accuracy of the termination resistor, and does not depend on the accuracies of components of the passive equalizer, which results in higher directivity in volume production.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

What is claimed is:

1. A device comprising:
   a directional coupler having an input port, a transmitted port, a coupled port and an isolated port;
   a first passive equalizer having a first terminal coupled to a first one of the coupled port or the isolated port of the directional coupler, the first passive equalizer comprising:
      a resonator comprising a first inductor and a first capacitor, the resonator coupled between the first terminal and a second terminal of the first passive equalizer;
      a first resistor and a second resistor serially connected between the first and the second terminals of the first passive equalizer, the first resistor connected to the second resistor at a first node; and
      a shunt network coupled between a reference terminal and the first node; and
   a switch coupled between the directional coupler and the first passive equalizer, the switch having a first position and a second position, wherein:
      at the first position of the switch, the first terminal of the first passive equalizer is coupled to the coupled port of the directional coupler, and the isolated port of the directional coupler is terminated; and
      at the second position of the switch, the first terminal of the first passive equalizer is coupled to the isolated port of the directional coupler, and the coupled port of the directional coupler is terminated.

2. The device of claim 1, further comprising a termination load coupled to a second one of the coupled port or the isolated port of the directional coupler.

3. The device of claim 1, further comprising a second passive equalizer coupled to a second one of the coupled port or the isolated port of the directional coupler.

4. The device of claim 1, wherein the resonator comprises a first inductor and a first capacitor coupled in parallel between the first and the second terminals of the first passive equalizer.

5. The device of claim 4, wherein the shunt network comprises a second capacitor coupled between the reference terminal and the first node.

6. The device of claim 5, wherein a capacitance of the first capacitor is adjustable.

7. The device of claim 5, wherein the first and the second resistors have a same resistance R, where R=$\sqrt{L/C}$, L is the inductance of the first inductor, and C is the capacitance of the second capacitor.

8. The device of claim 5, wherein the first passive equalizer is configured to provide a frequency-selective notch outside a pre-determined frequency range.

9. The device of claim 1, wherein the resonator comprises a first inductor and a first capacitor serially connected between the first and the second terminals of the first passive equalizer.

10. The device of claim 9, wherein the shunt network comprises a second inductor and a second capacitor coupled in parallel between the reference terminal and the first node.

11. The device of claim 10, wherein the first and the second resistors have a same resistance R, where $$R = \sqrt{\frac{L_2(\omega^2 L_1 C_1 - 1)}{C_1(\omega^2 L_2 C_2 - 1)}},$$

$C_1$ is the capacitance of the first capacitor, $L_1$ is the inductance of the first inductor, $L_2$ is the inductance of the second inductor, $C_2$ is the capacitance of the second capacitor, and $\omega$ is the angular frequency.

12. The device of claim 1, wherein the directional coupler and the first passive equalizer are monolithically integrated on a semiconductor substrate.

13. An integrated circuit (IC) comprising:
   a directional coupler disposed on a semiconductor substrate;
   a first switch and a second switch coupled to a coupled port and an isolated port of the directional coupler, respectively, wherein each of the first switch and the second switch has a first position and a second position; and
   a passive equalizer having a first terminal coupled to one of the first switch or the second switch, the passive equalizer comprising a resonator circuit coupled between the first terminal and a second terminal of the passive equalizer, a first resistor serially connected to a second resistor at a node, the first and the second resistors coupled between the first terminal and the second terminal of the passive equalizer, and a shunt network coupled between the node and a reference terminal, wherein at the first positions of the first and the second switches, the first terminal of the passive equalizer is coupled to the coupled port of the directional coupler, and the isolated port of the directional coupler is terminated, and at the second positions of the first and the second switches, the first terminal of the passive equalizer is coupled to the isolated port of the directional coupler, and the coupled port of the directional coupler is terminated.

14. The IC of claim 13, wherein the resonator circuit comprises a first inductor and a first capacitor coupled in parallel between the first and the second terminals of the passive equalizer.

15. The IC of claim 14, wherein the shunt network comprises a second capacitor coupled between the node and the reference terminal.

16. The IC of claim 14, wherein a capacitance of the first capacitor of the resonator circuit is adjustable.

17. The IC of claim 14, wherein the passive equalizer further comprises a third switch coupled between the first capacitor and one of the first terminal or the second terminal of the passive equalizer.

18. The IC of claim 14, further comprising:
a third capacitor coupled in parallel to the first capacitor; and
a fourth switch coupled between the third capacitor and one of the first terminal or the second terminal of the passive equalizer.

19. The IC of claim 13, wherein the passive equalizer reduces variations of a coupling factor of the directional coupler over a pre-determined bandwidth, provides a substantially constant impedance over the pre-determined bandwidth, and provides a frequency selective notch outside the pre-determined bandwidth to suppress a set of pre-determined frequencies.

20. The IC of claim 13, wherein the resonator circuit comprises a first inductor and a first capacitor serially connected between the first and the second terminals of the passive equalizer.

21. The IC of claim 20, wherein the shunt network comprises a second inductor and a second capacitor coupled in parallel between the node and the reference terminal.

22. The IC of claim 13, wherein the directional coupler is disposed in one or more layer over the semiconductor substrate.

23. A method of operating a directional coupler comprising:
providing an input radio frequency (RF) signal to one of an input port or an output port of the directional coupler;
equalizing an output signal at one of a coupled port or an isolated port of the directional coupler using a passive equalizer, the passive equalizer comprising:
a first terminal coupled to the one of the coupled port or the isolated port of the directional coupler;
a resonator coupled between the first terminal and a second terminal of the passive equalizer;
a first resistor and a second resistor serially connected between the first terminal and the second terminal of the passive equalizer; and a second capacitor coupled between a reference terminal and a node, the node being connected to the first resistor and the second resistor; and switching a switch coupled between the directional coupler and the passive equalizer to a first one of a first switching position or a second switching position, wherein:
at the first switching position of the switch, the first terminal of the passive equalizer is coupled to the coupled port of the directional coupler, and the isolated port of the directional coupler is terminated; and
at the second switching position of the switch, the first terminal of the passive equalizer is coupled to the isolated port of the directional coupler, and the coupled port of the directional coupler is terminated.

24. The method of claim 23, wherein the resonator comprises a first inductor and a first capacitor connected in parallel, and the method further comprises varying a capacitance of the first capacitor to change a location of a frequency selective notch to suppress a pre-determined set of frequencies.

25. The method of claim 23, wherein the resonator comprises a first inductor and a first capacitor serially connected, and the passive equalizer further comprises a second inductor coupled in parallel to the second capacitor to form a shunt resonator, and the method further comprises tuning the first resonator and the shunt resonator to a resonant frequency at a lower end of a pre-determined bandwidth.

26. The method of claim 23, wherein the resonator comprises a first inductor and a first capacitor serially connected, and the passive equalizer further comprises a second inductor coupled in parallel to the second capacitor to form a shunt resonator, and the method further comprises tuning the first resonator and the shunt resonator to a first resonant frequency and a second resonant frequency at a lower end of a pre-determined bandwidth, respectively.

27. A device comprising:
a directional coupler having an input port, a transmitted port, a coupled port and an isolated port; and
a first passive equalizer having a first terminal coupled to a first one of the coupled port or the isolated port of the directional coupler, the first passive equalizer comprising:
a resonator comprising a first inductor and a first capacitor serially connected between the first terminal and a second terminal of the first passive equalizer;
a first resistor and a second resistor serially connected between the first terminal and the second terminal of the first passive equalizer, the first resistor connected to the second resistor at a first node; and
a shunt network comprising a second inductor and a second capacitor coupled in parallel between a reference terminal and the first node, wherein the first resistor and the second resistors have a same resistance R, where $$R = \sqrt{\frac{L_2(\omega^2 L_1 C_1 - 1)}{C_1(\omega^2 L_2 C_2 - 1)}},$$

$C_1$ is the capacitance of the first capacitor, $L_1$ is the inductance of the first inductor, $L_2$ is the inductance of the second inductor, $C_2$ is the capacitance of the second capacitor, and $\omega$ is the angular frequency.

* * * * *